United States Patent
Hygh et al.

(10) Patent No.: US 10,001,843 B2
(45) Date of Patent: Jun. 19, 2018

(54) MODULAR SENSING DEVICE IMPLEMENTING STATE MACHINE GESTURE INTERPRETATION

(71) Applicant: Sphero, Inc., Boulder, CO (US)

(72) Inventors: David Hygh, Boulder, CO (US); Fabrizio Polo, Boulder, CO (US)

(73) Assignee: Sphero, Inc., Boulder, CO (US)

( * ) Notice: Subject to any disclaimer, the term of this patent is extended or adjusted under 35 U.S.C. 154(b) by 0 days. days.

(21) Appl. No.: 15/253,799

(22) Filed: Aug. 31, 2016

(65) Prior Publication Data

US 2017/0192518 A1 Jul. 6, 2017

Related U.S. Application Data

(60) Provisional application No. 62/274,514, filed on Jan. 4, 2016, provisional application No. 62/346,216, filed on Jun. 6, 2016.

(51) Int. Cl.
*G05B 11/01* (2006.01)
*G06F 3/01* (2006.01)
(Continued)

(52) U.S. Cl.
CPC ............. *G06F 3/017* (2013.01); *A63F 13/21* (2014.09); *A63F 13/211* (2014.09);
(Continued)

(58) Field of Classification Search
None
See application file for complete search history.

(56) References Cited

U.S. PATENT DOCUMENTS 9,599,992 B2 3/2017 Kohstall
9,663,227 B1 5/2017 Lema
(Continued)

FOREIGN PATENT DOCUMENTS

EP 2876907 5/2015
KR 10-2012-0006160 1/2012
(Continued)

OTHER PUBLICATIONS

PCT International Search Report and Written Opinion in PCT/US2017/020762, dated May 24, 2017, 16 pages.
(Continued)

*Primary Examiner* — Adolf Dsouza
(74) *Attorney, Agent, or Firm* — Merchant & Gould P.C.

(57) ABSTRACT

A modular sensing device can include an inertial measurement unit to generate sensor data corresponding to user gestures performed by a user, a mode selector enabling the user to select a mode of the modular sensing device out of a plurality of modes, and one or more output devices to generate output based on the user gestures and the selected mode. The modular sensing device can further include a controller to implement a plurality of state machines. Each state machine can be associated with a corresponding user gesture by a sensor data signature. The state machine can execute a state transition when the sensor data matches the sensor data signature. The executed state transition can cause the controller to generate a corresponding output via the one or more output devices specific to the selected mode and based on the corresponding user gesture.

20 Claims, 7 Drawing Sheets

(51) Int. Cl.

| | | |
|---|---|---|
| G08B 7/06 | (2006.01) | |
| A63F 13/21 | (2014.01) | |
| A63F 13/28 | (2014.01) | |
| A63F 13/32 | (2014.01) | |
| A63H 17/26 | (2006.01) | |
| A63H 23/04 | (2006.01) | |
| A63H 27/00 | (2006.01) | |
| A63H 30/04 | (2006.01) | |
| A63H 33/00 | (2006.01) | |
| G05D 1/00 | (2006.01) | |
| G06F 1/16 | (2006.01) | |
| G06F 3/0346 | (2013.01) | |
| G06F 3/0485 | (2013.01) | |
| G06F 3/16 | (2006.01) | |
| A63F 13/211 | (2014.01) | |
| A63F 13/235 | (2014.01) | |
| G06F 3/02 | (2006.01) | |
| G06F 3/038 | (2013.01) | |
| G08C 17/02 | (2006.01) | |
| H04W 4/00 | (2018.01) | |
| H04W 8/00 | (2009.01) | |
| G06F 3/0488 | (2013.01) | |
| H04W 84/18 | (2009.01) | |
| H04L 12/28 | (2006.01) | |

(52) U.S. Cl.
CPC ............ *A63F 13/235* (2014.09); *A63F 13/28* (2014.09); *A63F 13/32* (2014.09); *A63H 17/26* (2013.01); *A63H 23/04* (2013.01); *A63H 27/00* (2013.01); *A63H 27/12* (2013.01); *A63H 30/04* (2013.01); *A63H 33/005* (2013.01); *G05D 1/0016* (2013.01); *G06F 1/163* (2013.01); *G06F 3/016* (2013.01); *G06F 3/02* (2013.01); *G06F 3/038* (2013.01); *G06F 3/0346* (2013.01); *G06F 3/0485* (2013.01); *G06F 3/167* (2013.01); *G08B 7/06* (2013.01); *G08C 17/02* (2013.01); *H04W 4/008* (2013.01); *H04W 8/005* (2013.01); *A63F 2300/405* (2013.01); *A63F 2300/8082* (2013.01); *G05D 2201/0214* (2013.01); *G06F 3/04883* (2013.01); *G08C 2201/32* (2013.01); *G08C 2201/92* (2013.01); *H04L 12/2803* (2013.01); *H04W 84/18* (2013.01)

(56) References Cited

U.S. PATENT DOCUMENTS

| | | |
|---|---|---|
| 2004/0047244 A1 | 3/2004 | Iino |
| 2009/0222149 A1 | 9/2009 | Murray |
| 2010/0124949 A1 | 5/2010 | Demuynck et al. |
| 2010/0156676 A1 | 6/2010 | Mooring |
| 2011/0090407 A1 | 4/2011 | Lee |
| 2011/0159939 A1 | 6/2011 | Lin et al. |
| 2011/0205156 A1 | 8/2011 | Gomez et al. |
| 2012/0168241 A1 | 7/2012 | Bernstein et al. |
| 2012/0242481 A1 | 9/2012 | Gernandt et al. |
| 2014/0008496 A1 | 1/2014 | Zhou et al. |
| 2014/0020964 A1 | 1/2014 | Bernstein et al. |
| 2014/0143784 A1 | 5/2014 | Mistry et al. |
| 2014/0155162 A1 | 6/2014 | Mattice |
| 2014/0180582 A1 | 6/2014 | Pontarelli |
| 2014/0347265 A1 | 11/2014 | Aimone et al. |
| 2014/0371906 A1 | 12/2014 | Barajas |
| 2015/0026647 A1 | 1/2015 | Park et al. |
| 2015/0054630 A1 | 2/2015 | Xu et al. |
| 2015/0062086 A1 | 3/2015 | Rohildev |
| 2015/0077336 A1 | 3/2015 | Elangovan |
| 2015/0304785 A1 | 10/2015 | Gan et al. |
| 2015/0338925 A1* | 11/2015 | Bernstein ................ G06F 3/017 345/156 |
| 2016/0299572 A1* | 10/2016 | Grover .................... G06F 3/017 |
| 2016/0313742 A1 | 10/2016 | Wang |
| 2017/0031446 A1 | 2/2017 | Clark |
| 2017/0064181 A1 | 3/2017 | Zhang |
| 2017/0147077 A1* | 5/2017 | Park ........................ G06F 1/163 |
| 2017/0180537 A1* | 6/2017 | Heo ..................... H04M 1/7253 |
| 2017/0189803 A1 | 7/2017 | Atwell et al. |
| 2017/0189824 A1 | 7/2017 | Godby et al. |
| 2017/0192516 A1 | 7/2017 | Godby et al. |
| 2017/0192517 A1 | 7/2017 | Hygh et al. |
| 2017/0193813 A1 | 7/2017 | Carroll et al. |

FOREIGN PATENT DOCUMENTS

| | | |
|---|---|---|
| KR | 10-2015-0063998 | 6/2015 |
| WO | 2015060856 | 4/2015 |
| WO | 2015094220 | 6/2015 |
| WO | 2015102467 | 7/2015 |

OTHER PUBLICATIONS

PCT International Search Report and Written Opinion in PCT/US2017/020771, dated Jul. 12, 2017, 17 pages.
PCT International Search Report and Written Opinion in PCT/US2017/020775, dated May 24, 2017, 14 pages.
PCT International Search Report and Written Opinion in PCT/US2017/020779, dated May 24, 2017, 14 pages.
PCT International Search Report and Written Opinion in PCT/US2017/020786, dated May 24, 2017, 15 pages.
U.S. Appl. No. 15/253,778, Office Action dated Jan. 12, 2018, 6 pages.
U.S. Appl. No. 15/253,790, Office Action dated Jun. 29, 2017, 15 pages.
U.S. Appl. No. 15/253,790, Amendment and Response filed Oct. 31, 2017, 12 pages.
U.S. Appl. No. 15/253,790, Notice of Allowance dated Nov. 27, 2017, 8 pages.
PCT International Search Report and Written Opinion in PCT/US2017/020790, dated Sep. 6, 2017, 15 pages.
U.S. Appl. No. 15/253,763, Office Action dated Mar. 1, 2018, 14 pages.

* cited by examiner

MODULAR SENSING DEVICE IMPLEMENTING STATE MACHINE GESTURE INTERPRETATION

CROSS REFERENCE TO RELATED APPLICATIONS

This application claims the benefit of priority to U.S. Provisional Patent Application Ser. No. 62/274,514, entitled "PORTABLE SENSING DEVICE FOR PROCESSING GESTURES AS INPUT," and filed on Jan. 4, 2016; and U.S. Provisional Application Ser. No. 62/346,216, entitled "MODULAR SENSING DEVICE FOR PROCESSING GESTURES AS INPUT," and filed on Jun. 6, 2016; the aforementioned priority applications being hereby incorporated by reference in their respective entireties.

BACKGROUND

Remotely operated self-propelled devices are typically operable by way of analog or digital controller devices that communicate a limited amount of preconfigured commands. Such commands typically involve signaled radio frequency communications to accelerate and maneuver the self-propelled device. Furthermore, wearable device technology in consumer electronics is rapidly being integrated into routine user activities, such as sporting activities, content viewing or browsing, and task-oriented activities (e.g., gaming).

Furthermore, wireless networks typically utilize protocols that enable wireless devices to detect signal sources from other devices for initiating data and communication links. Such networks are typically implemented using networking hardware, which may be incorporated in various wireless network devices, such as access points (APs), peer-to-peer (P2P) devices, wireless local area network (LAN) equipped devices, and the like—each advertising a unique identity (e.g., a media access control (MAC) address) indiscriminately to devices within range. Connections may be established with such devices to transmit and receive data.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1A:
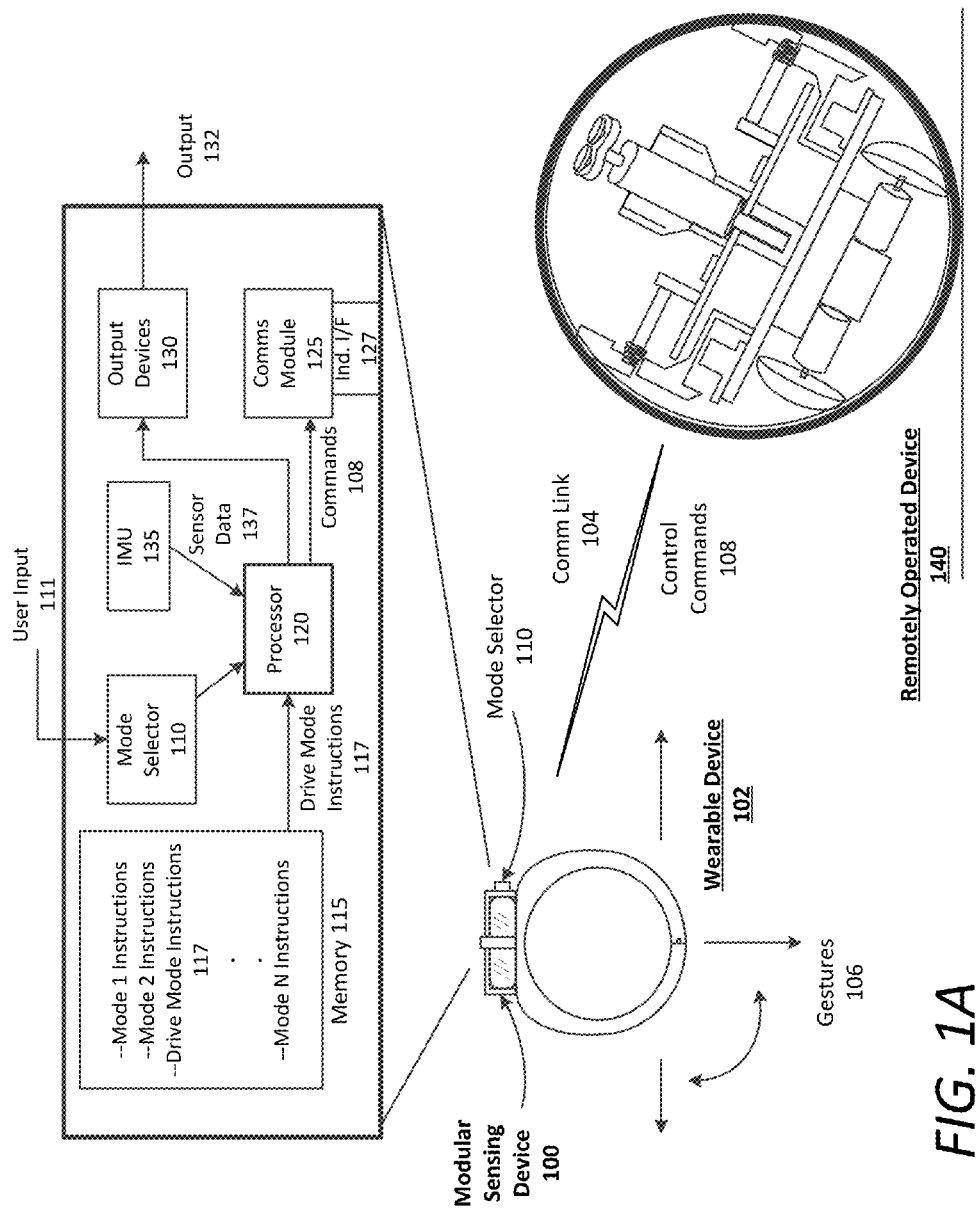
FIG. 1A illustrates a block diagram of an example modular sensing device for use in controlling a remotely operated device, according to examples described herein.

Examples described herein relate to a multi-modal modular sensing device, worn or carried by a user (e.g., as a wrist-worn device), to enable a variety of interactions with other devices through sense movement of the modular sensing device. Among other activities, examples provide for a modular sensing device that can individually, or in combination with another device (e.g., controller device, such as a mobile computing device) control other devices, interact with compatible devices of other users, and/or operate in connection with task-oriented activities (e.g., gameplay). In some examples, the modular sensing device corresponds to a wearable device (e.g., a watch, a pendant for a necklace, a hat, glasses) can be placed in multiple modes to, for example, control the characteristics of movement of another device, or interact with the real-world. For example, the modular sensing device can control acceleration and maneuvering of a self-propelled device.

In certain aspects, a modular sensing device can include an inertial measurement unit (IMU), and can be operated in multiple modes in which gestures (e.g., arm gestures) may be translated based on the particular mode of the wearable device. In one example, the modular device can be insertable into multiple devices, such as a wrist worn device, clothing, an accessory device (e.g., a toy sabre or sword), a wearable pendant, ring, hat, and the like. The modular sensing device can further include output devices, such as lighting elements (e.g., one or more LEDs), an audio device (e.g., a speaker), and/or a haptic feedback system. In one example, the modular sensing device further includes a charging port (e.g., a mini-universal serial bus port) to enable charging of a power source included in the device.

According to some examples, a modular sensing device is operable to detect its own movement in three-dimensional space, using the IMU. In some implementations, the IMU can be an integrated device. Alternatively, the IMU can be implemented through a combination of sensors, such as a three-dimensional accelerometer or gyroscope. In certain examples, the modular sensing device can include a processor and memory to interpret the sensor data, and to communicate interpreted sensor data to another device (e.g., mobile computing device) using a wireless connection (e.g., BLUETOOTH). In variations, the sensor data can generate data that is either raw data or processed, depending on the processing resources that are selected for the modular sensing device, and the processing load which is implemented for the modular sensing device.

In many implementations, the modular sensing device can generate output (e.g., haptic, audio, and/or visual output) or control commands for operating a remote controlled device by utilizing state machines in memory that correspond to individual gestures or combinations of gestures. Depending on a selected mode of the modular sensing device, processing resources of the modular sensing device can monitor logical state machines or automatons that correspond to specified sensor data combinations (e.g., based on gestures performed by a user). For example, a single state machine can correspond to an initial arm raising gesture performed by the user wearing a wrist-worn device having the modular sensing device. A sensor profile from a single sensor or multiple sensors included in the IMU (e.g., gyroscopic sensor and/or accelerometer) can indicate the initial arm raising gesture, which can trigger a state transition for the state machine. This state transition can cause processing resources of the modular sensing device to automatically generate a control command to cause the remote controlled device to accelerate.

Additionally, a second state machine can correspond to an increased angle in the arm raising gesture. When the sensor profile of the IMU indicates the gesture above a certain predetermined angle, a state transition can be triggered for the second state machine, which can trigger an increased acceleration command to be generated automatically. Several state machines can be comprised in memory of the modular sensing device, and can each correlate to a specified sensor data profile, from simple single-action gestures, to complex multiple-motion gestures. Furthermore, an interpretation engine (e.g., a processor) can interpret each state transition for each state machine based on a particular mode and/or sub-mode of the modular sensing device to generate a corresponding output (e.g., a control command and/or a combination of visual, haptic, and audible output).

As used herein, a "modular sensing device" can comprise an electronic device that includes sensor resources for detecting its own movement, and of dimension and form factor suitable for being insertable into any number of devices configured for receiving the device. Numerous examples of modular sensing devices are provided in the context of a "wearable device," such as a wrist worn device (e.g., watch, watch band, bracelet). But as noted by other examples, variations to the type and form factor of a wearable device can vary significantly, encompassing, for example, eyeglasses, hats, pendants, armbands, glasses and various other form factors. While many examples describe functionality in the context of a wearable device, embodiments extend such examples to other form factors in which a modular sensing device may be inserted, such as wands, fobs, wielded toys, or mobile communication devices.

In many examples, the wearable device can include one or more sensors to detect the device's own movements. In particular, a wearable device includes an accelerometer and/or a gyroscopic sensor. In some examples, sensor data, corresponding to user gestures performed by the user wearing the wearable device, can be translated into control commands or data packets to be transmitted and implemented based on the selected mode of the wearable device. According to many examples, the wearable device can include an inductive interface to inductively pair with other devices, which can trigger a specified mode on the wearable device. For example, an inductive pairing between the wearable device and a self-propelled device can trigger a drive mode in which the wearable device can be utilized by the user to operate the self-propelled device. Additionally or alternatively, the wearable device can include an input mechanism, such as an analog or digital button, that enables the user to select a particular mode and/or scroll through a series of modes for the wearable device.

Among other functionality, some examples described herein provide for alternative modes of operation, including, for example (i) a "drive mode" in which the wearable device is utilized to control a self-propelled device; (ii) a "control mode" in which the wearable device is utilized in connection with smart home devices; (iii) a "finding mode" or "finder mode" in which the wearable device is utilized to detect virtual or digital resources; (iv) a "mining mode" which can be initiated by the user to collect virtual resources when they are detected in the finder mode; (v) a "training mode" in which the wearable device is utilized in connection with a self-propelled device to assist the user in training for certain achievements or for increasing the user's abilities to perform task-oriented activities (e.g., increasing skills for a subsequent game or sporting activity); (vi) a "sword mode" in which the wearable device provides feedback (e.g., haptic, audio, and/or visual feedback) when the user performs actions while holding an object; (vii) a "default mode" in which the device monitors for and detects other proximate wearable devices (e.g., wearable devices of the same type) which enables the users to pair with each other's wearable devices; (viii) a "interactive mode" or "battle mode" selectable in response to two or more device pairings in which users are able to interact with each other with predetermined sets of actions (e.g., offensive and defensive actions learned and perfected by users practicing in the training mode); (ix) a "sharing mode" selectable in response to two or more device pairings in which users can share information stored in each other's wearable devices, or user accounts associated with the wearable devices (e.g., sharing collected virtual resources discovered and mined in the finder and mining modes to be expended or consumed in a gameplay environment); and (x) a "gaming mode" in which the wearable device can be utilized in connection with a game.

Still further, numerous examples make reference to a "self-propelled" device. A self-propelled device can include, for example, a device that can be wirelessly and remotely controlled in its movement, whether the movement is on ground, water or air. For example, a self-propelled device can include a wirelessly and remotely controlled drone, car, airplane, helicopter, boat, etc. While conventional examples enable control of a self-propelled device, conventional approaches generally utilize a perspective of the device being controlled. While some conventional devices, for example, enable a computing device held by the user to project a perspective of the device under control, examples described herein enable control of such devices to utilize an orientation of the user. Specifically, some examples include a modular sensing device that can determine an orientation of the user, and further enable control of the self-propelled device through an environment that accommodates or is in the perspective of the user, based on the orientation of the user (as determined by the modular sensing device). By way of example, the control of a self-propelled device can be projected through an orientation or perspective of the user for purpose of a virtual environment.

Some examples include a modular sensing device having a wireless communication module (e.g., a BLUETOOTH low energy module) that enables communication of sensor data (e.g., raw sensor data from the accelerometer or gyroscopic sensor), or translated data (i.e., translations of the sensor data based on the selected mode of the wearable device). In some examples, the sensor data may be relayed for translation by a mobile computing device before being transmitted to another device (e.g., a paired wearable device or a paired self-propelled device). In other examples, processing resources of the wearable device can execute mode instructions, based on the selected mode, to translate the sensor data (e.g., via use of state machines that trigger control commands or feedback based on a selected mode of the modular sensing device) for direct transmission to one or more other devices, as described herein.

As used herein, a "user gesture" includes gestures performed by a user while utilizing the modular sensing device, whether inserted into a wearable device or a wielded object. For example, the modular sensing device may be inserted into a wrist-worn device, in which case gestures may be any number of physical movements or actions that affect the IMU of the device when it is worn on the wrist. Such movements and actions can include shaking, arm movements (e.g., raising lowering, pointing, twisting, and any combination thereof), wrist movements, hand actions (such as grasping or grabbing), and the like. However, wearable devices described herein are not limited to wrist-worn devices, but may be utilized as a ring (e.g., a finger-worn device), an ankle-worn device, a neck-worn device, a head-worn device, a belt (e.g., a waist-worn device), etc. Thus, gestures performed using the modular sensing device can be any actions or movements in which correlated sensor data from sensors of the device can be translated into commands, instructions, feedback, etc. depending on the mode of the wearable device.

Among other benefits, examples described herein achieve a technical effect of enhancing user interactivity with other devices and other users. Such interactivity may include utilizing the modular sensing device to control a self-propelled device, interact with other users of wearable devices, collect and share data, control smart home devices, interact with the real-world via a gaming interface through the modular sensing device, and the like.

One or more examples described herein provide that methods, techniques, and actions performed by a computing device, a modular sensing device, or a self-propelled device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules or components of a system. A programmatic module or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein can be implemented, in whole or in part, on computing devices such as digital cameras, digital camcorders, desktop computers, virtual reality (VR) or augmented reality (AR) headsets, cellular or smart phones, personal digital assistants (PDAs), laptop computers, printers, digital picture frames, and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a non-transitory computer usable carrier medium capable of carrying such a program.

System Description

FIG. 1A illustrates a block diagram of an example modular sensing device for use in controlling a remotely operated device, according to examples described herein. The modular sensing device 100 shown in FIG. 1A may be integrated with a wearable device 102 (e.g., a wrist-worn device, pendant, clothing, a hat, eyeglasses, an ankle-worn device, a ring, etc.), or can be inserted into a compartment or otherwise included as a part of the wearable device 102. The wearable device 102, or modular sensing device 100 disposed therein, can include a mode selector 110, such as an analog button that enables the user to select a mode of the device. In one example, repeated user input 111 on the mode selector 110 enables the user to scroll through a list of available modes. Such modes can include, but are not limited to a drive mode, a control mode, a finder mode, a mining mode, a training mode, a sword mode, a default mode, an interactive or battle mode, a sharing mode, and a gaming mode, as described herein. As shown in the block diagram of FIG. 1A, a user input 111 on the mode selector 110 can cause a processor 120 of the modular sensing device 100 to generate an output 132 that indicates the particular mode selected. For example, the modular sensing device 100 can include a number of output devices 130, such as an audio device, a haptic system, and/or visual elements (e.g., an LED array or display). Each user input 111 on the mode selector 110 can trigger an audio, haptic, and/or visual output 132, indicating the particular mode (e.g., a drive mode). As an example, the output 132 can comprise a voice output that states the selected mode, or a combination of voice, visual, and haptic output.

Additionally or alternatively, the user may connect the wearable device 102 with a mobile computing device, such as the user's smart phone or tablet computer. Mode selection may be performed automatically by the user initiating a designated application of the mobile computing device, such as a smart home application, a controller application (e.g., to control a self-propelled device), a gaming application, and the like. In variations, the user can execute a designated application in connection with the wearable device 102 that enables the user to scroll through the various modes. The user may scroll through the modes on the mobile computing device, or via successive selection inputs on the mode selector 110, which can trigger the mobile computing device to display a selectable mode. In other variations, multiple types of inputs can be performed in the mode selector 110, such as tap gestures and tap and hold gestures, which can correlate to scrolling through the modes and selecting a particular mode respectively. As provided herein, the mode selector 110 can be an input mechanism such as an analog or digital button, a touch panel such as a track pad, or a miniature touch-sensitive display device.

According to examples provided herein, the modular sensing device 100 can include a memory 115 that stores mode instruction sets executable by the processor 120 based on the mode selected by the user. Each mode instruction set can cause the processor 120 to interpret sensor data 137 in a particular manner. Along these lines, same or similar gestures 106 performed by the user can result in different generated outputs 132 or commands 108 depending on the mode selected by the user. In some implementations, selection of a particular mode can cause the processor 120 to initiate a communications module 125 of the modular sensing device 100 to establish a wireless connection with another device. In one example, the modular sensing device 100 can include a BLUETOOTH low energy module to enable communications with one or more other devices, such as a second modular sensing device or a remotely operated device 140.

The modular sensing device 100 can be relatively small in size compared to current computing devices, and in many implementations, the modular sensing device 100 does not include a power-intensive memory and computational resources. In such implementations, the memory can be comprised of a series of state machines that, when transitioned, can trigger a particular output automatically. Further description of the state machine implementations is provided below with respect to FIG. 1B. Furthermore, examples described herein with respect to the drive mode of the modular sensing device 100 can also be implemented in the state machine examples described herein.

As provided herein, the memory 115 can include a drive mode instruction set 117 executable by the processor 120 in response to a user input 111 on the mode selector 110. In some aspects, execution of the drive mode instructions 117 can cause the processor 120 to initiate the communications module 125 to establish a communications link 104 with a proximate remotely operated device 140. In variations, the modular sensing device 100 can include an induction interface 127 which can trigger the communication link 104 between the modular sensing device 100 and the remotely operated device 140. For example, upon selecting the drive mode, the user can place the wearable device 102 within inductive range (e.g., ~2-5 cm) of the remotely operated device 140, which can include a corresponding induction interface. The inductive transfer of communication information can enable the modular sensing device 100 to establish the communication link accordingly.

According to examples described, the modular sensing device 100 can further include an inertial measurement unit (IMU) 135 that can comprise a gyroscope and an accelerometer for accurate measurement of the modular sensing device's 100 movement and orientation. In variations, the IMU 135 can further include a magnetometer to, for example, assist in calibration based on the orientation. Once the communication link 104 is established in the drive mode, the processor 120 can monitor the sensor data 137 for the particular gestures 106 being performed by the user. In several examples, the gestures 106 can correspond to the user raising or lowering an arm, and/or performing additional arm motions. The sensor data 137 from the IMU 135 can comprise movement, position, and/or orientation information that the processor 120 can interpret in accordance with the drive mode. For example, gestures 106 performed by the user can be detected by the processor 120 via sensor data 137 from the IMU 135. Each of the gestures 106 can be interpreted by the processor 120 as one or more control commands 108 to be executed by the remotely operated device 140.

In one example, the drive mode can be automatically initiated in response to a particular detected gesture, regardless of the current mode of the modular sensing device 100. This gesture can correspond to a distinct sensor data signature that, when detected by the processor 120 in executing any mode, overrides that mode and initiates the drive mode automatically. Thus, upon detection of the distinct sensor data signature, the processor 120 can automatically initiate the communications module 125, establish the communications link 104 with the remotely operated device 140, and generate control commands 108 based on the detected gestures 106 performed by the user in the sensor data 137. The modular sensing device 100 may then dynamically transmit such control commands 108 to the remotely operated device 108 for execution as they are generated by the processor 120. In one example, the specific gesture corresponds to a pushing motion with an arm wearing the wearable device 102 performed by the user. As provided herein, this pushing motion can correspond to a specified sensor data signature not used for any other mode, and is therefore distinct to enable the processor 120 to identify it irrespective of the current mode of the modular sensing device 100.

In certain examples, gestures 106 such as raising an arm can cause the processor 120 to generate acceleration commands to drive away from the user. Lowering the arm can cause the processor to generate deceleration and/or reverse commands. Further, moving the arm from side to side can cause the processor 120 to generate steering or directional commands. For example, moving the arm left can cause the remotely operated device 140 to turn left, and moving the arm right can cause the device 140 to turn right as the device 140 travels away from the user. Such control commands 108 may be processed by a controller of the remotely operated device 140, or may be directly executed on the drive motors of the device 140 in order to accelerate and maneuver the device 140 in accordance with the gestures 106 performed by the user.

Furthermore, in the drive mode, angular thresholds can be established in the drive mode instructions 117 that can determine the manner in which the processor 120 interprets the sensor data 137. When such thresholds are crossed, the processor 120 can alter interpretation of the sensor data 137 into alternative commands 108. For example, as the user raises the arm above an angular threshold (e.g., 45 degrees), and/or changes an orientation of the arm (e.g., palm down to palm up), the processor 120 can alter the interpretation of the sensor data 137 such that remotely operated device 140 drives towards the user as the arm is raised. Furthermore, in such a state, the directional interpretation of the sensor data 137 can be reversed such that moving the arm left can cause the remotely operated device 140 to turn right, and moving the arm right can cause the remotely operated device 140 to turn left. This directional reversal triggered by the angular threshold, and in combination with the change in orientation of the user's arm, can create a palm control illusion of the remotely operated device 140 by the user. Thus, in the drive mode, specified gestures detected in the sensor data 137 (e.g., the user's arm rotating or crossing an angular threshold) can trigger the processor 120 to interpret the sensor data 137 differently in order to produce the illusion.

Figure 1B:
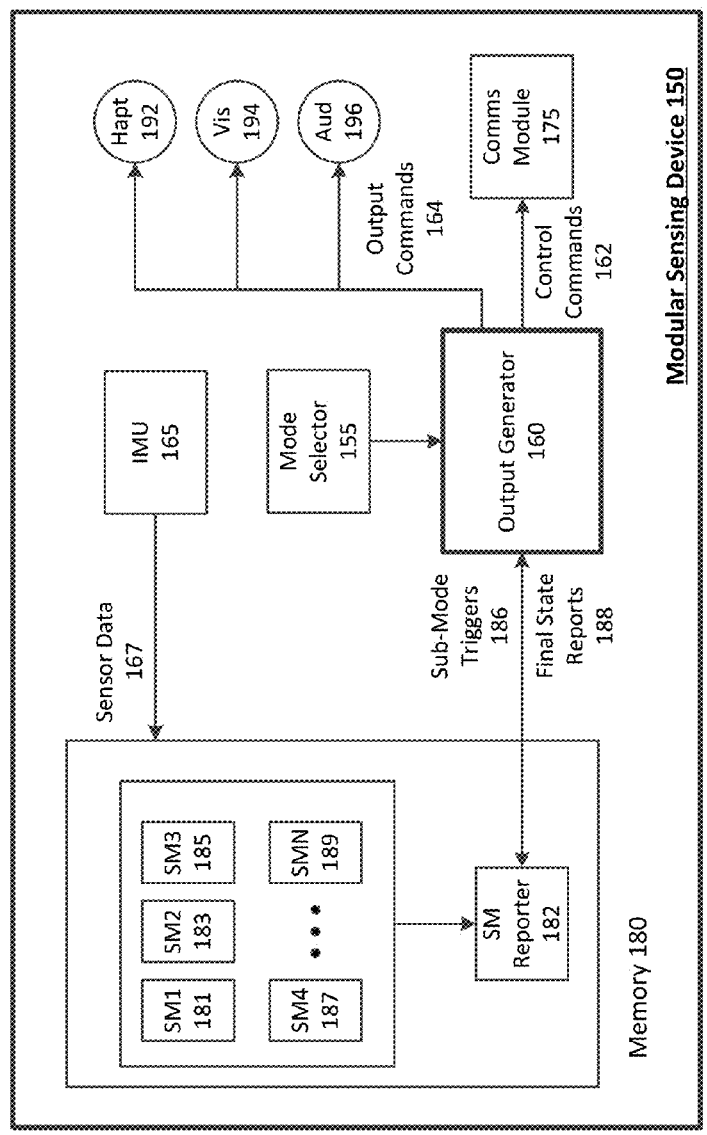
FIG. 1B is a block diagram illustrating an example modular sensing device, as shown and described herein.

FIG. 1B is a block diagram illustrating an example modular sensing device, as shown and described herein. As provided herein, the modular sensing device 150 can be space limited, and can only include a limited amount memory and computational resources. In such implementations, the modular sensing device 150 can represent each possible gesture that can be performed by a user as a state machine. Thus, for each gesture, a state machine corresponding to that gesture can either positively identify its gesture or negatively identify its gesture. When a positive gesture is identified, the state machine triggers a state transition which can cause an output generator 160 to generate a particular output accordingly. As provided herein, the output generator 160 and memory 180 can comprise a hardware controller implementing the various state machines to generate the output commands 164.

As an illustration, the modular sensing device 150 can include a memory 180 implementing a number of state machines (e.g., SM1 181, SM2 183, SM3 185, SM4 187, . . . , SMN 189), each being associated with a particular gesture. For example, SM1 181 can be associated with the user raising an arm, SM2 183 can be associated with the user lowering an arm, SM3 185 can be associated with the user pointing an arm to the right, and SM4 187 can be associated with the user pointing an arm to the left. Furthermore, any number of state machines may be implemented in the memory 210 representing any number of gestures. At any given time step, the state machines can be instantiated for each gesture type, and each state machine can continuously inspect the instantaneous sensor data 167 from the IMU 165 in order to initialize or instantiate, transition individual states along a state string, terminate a current state string, or trigger an accept state or final state. When the final state is triggered, this means that the particular gesture corresponding to that state machine has been performed by the user.

According to examples, each state machine can consist of a finite set of states (a fixed string of states), one or more inputs, one or more outputs, a transition function, and an initial state. The state machine can be linked to a particular gesture by way of a sensor data signature, which can comprise an accelerometer data signature, gyroscope data signature, or a combination of both. Furthermore, the state machine can be linear and directional, with each state having a particular error tolerance in its sensor data signature. A final state of a state machine can thus be triggered when the full sensor data signature of a particular gesture is matched to the sensor data 167 generated by the IMU 165.

In some aspects, if at any time after instantiating, an associated gesture corresponding to a respective state machine is not being performed, the input string for that state machine, and for that particular instantiation, automatically terminates. At any given instance, the state machine either terminates from the outset (e.g., an initial aspect of the sensor data signature for the gesture is not matched), or instantiates the input string towards the final state. At any given state along the input string, the state machine can terminate if the gesture being performed diverges from the error tolerances built into the state machine. If, however, each state along the input string is transitioned accordingly (i.e., the sensor data 167 from the IMU 165 matches the sensor data signature for that state machine within its error tolerances), the final state is triggered for that state machine.

The memory 180 can include a state machine reporter 182 that can report such final state transitions 188 to an output generator 160 of the modular sensing device 150. The output generator 160 can be configured based on the particular mode of the modular sensing device 150. Accordingly, final state reports 188 from individual state machines can be interpreted differently depending on the mode. In other words, the output from the modular sensing device 150 for a particular gesture (e.g., a backhanded swinging motion) can be different depending on the mode initiated via the mode selector 155. Furthermore, certain final state reports 188 from the state machine reporter 182 can correspond to sub-mode triggers 186 for the particular mode. Such sub-mode triggers 186 may not trigger an output, but rather trigger the output generator 160 to alter interpretation of certain final state reports 188 in order to generate a alternative output.

Such outputs generated by the output generator 160 can comprise control commands 162 to operate a remotely operated device, such as acceleration, steering, and deceleration commands. In some aspects, the output generator 160 can generate output commands 164 for the modular sensing device's 150 haptic system 192, visual system 194, and/or audio system 196. Thus, as final state reports 188 are received, the output generator 160 can cause the haptic 192, visual 194, and audio 196 systems of the modular sensing device 150 to produce individual or combined outputs. As described herein, such outputs can include vibration feedback or guidance, colored lights or display output, tonal outputs such as audible chimes that indicate positive and/or negative feedback, and voice output.

In the example of the drive mode described with respect to FIG. 1A, each completed arm gesture can correspond to a final state machine report 188, and can cause the output generator 160 to generate a control command 162 accordingly. In the example shown in FIG. 1B, the user raising an arm above a certain angle (e.g., five degrees) can cause a state machine corresponding to that gesture to transition to a final state. The state machine reporter 182 can report the final state 188 of that state machine to the output generator 160, which, based on the drive mode interpretation, can generate a control command 162 to initiate acceleration of the remotely operated device. This control command 162 may then be transmitted to the remotely operated device via the communications module 175 of the modular sensing device 150.

Referring to both FIGS. 1A and 1B, in certain modes, the communications module 125, 175 can act as a signal or beacon sensor which can provide signal data to the processor 120 or output generator 160. Based on the mode, the processor 120 or output generator 160 can generate a specified response based on the signal data. For example, the signal data can indicate a unique identifier of the signal source. The memory 115, 180 can include a UID log of specified signal sources that allow the user to interact with such sources based on the mode of the modular sensing device 100, 150. For example, if the signal source corresponds to another modular sensing device, the user can be enabled to select a mode in which the user can interact with the other user (e.g., play a physical game involving gestures).

As described with respect to FIG. 1A, the interpretation of the sensor data 137 can be altered based on a particular gesture trigger, such as the user's arm exceeding an angular threshold. The analog with respect to FIG. 1B comprises a state machine in the memory 180 that correlates to the particular threshold gesture. Thus, when the sensor data 167 indicates the specified threshold gesture, the correlated state machine can transition to its final state, which can be reported to the output generator 160 accordingly. Such a final state report 188 can comprise a sub-mode trigger 186, in that the sub-mode trigger 186 causes the output generator 160 to alter interpretation of certain final state reports 188 while remaining in the same mode. In the drive mode example, a sub-mode trigger 186 can correspond to the user raising an arm above a certain threshold (e.g., 45 degrees), which can cause the output generator 160 to, for example, reverse the interpretation of the final state reports 188 corresponding to the directional commands for the remotely operated device.

Additionally, each mode of the modular sensing device 150 can include any number of sub-mode triggers 186 that cause the output generator 160 to alter an interpretation of or disregard a particular final state report 188 corresponding to a specified sensor data signature. For example, the drive mode can include a set of angular gesture thresholds (e.g., raising an arm beyond 45 degrees, lower the arm below 45 degrees, turning the arm from palm down to palm up). A state machine can be dedicated—within the specified mode—to a sensor data signature indicating the user gesture crossing a gesture threshold. Thus, when the user gesture crosses the gesture threshold, the dedicated state machine can transition to its final state, which, when reported to the output generator 160 (i.e., as a sub-mode trigger 186), can cause the output generator 160 to alter interpretation of certain final state reports 188 within that mode. In some aspects, disregarded final state reports prior to the sub-mode trigger can now trigger a specified output (e.g., an audio, haptic, and/or visual output, or a particular control command 162).

In further examples, when the modular sensing device 150 is in a particular mode, a specific complex gesture—represented by a particular state machine in the memory 180—can cause the output generator 160 to reconfigure its interpretation of certain final state reports 188, execute a sub-mode, or automatically initialize a different mode for the modular sensing device 150. Accordingly, for any given instance, sensor data 167 from the IMU 165 can continuously cause the various state machines to instantiate, terminate, instigate state transitions, and/or transition to a final state. In aspects described, only when a state machine transitions to its final state does the output generator 160 generate output commands 164 and/or control commands 162 to provide feedback, operative control over a remotely operated device, guidance via the output devices, and/or task-based instructions (e.g., in accordance with a particular game).

Furthermore, the various aspects performed by the modular sensing device 100 described with respect to FIG. 1A may also be performed by example modular sensing devices 150 as shown and described with respect to FIG. 1B. Thus, the execution of designated modal instruction sets by the modular sensing device 100 of FIG. 1A—in which the processor 120 directly interprets the sensor data 137 based on the executing instruction set—may be substituted by the state machine examples as described with respect to FIG. 1B. In other words, the limited memory and computational resources of the modular sensing device 150 of FIG. 1B may be compensated by attributing sensor data signatures to state machines, requiring less memory and processing without sacrificing functionality.

Methodology

Figure 2A:
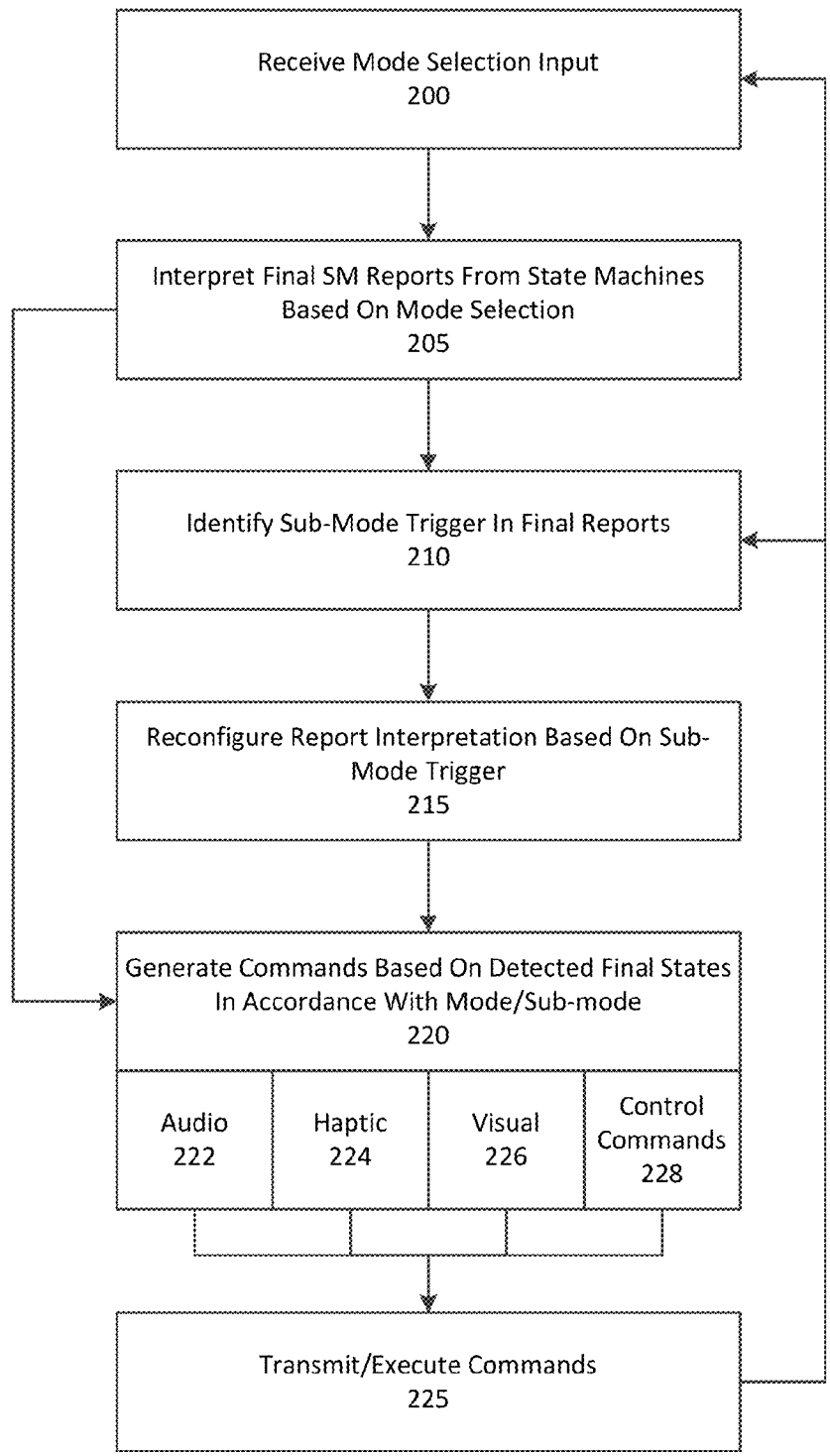
FIG. 2A is a flow chart describing an example method of generating commands by a modular sensing device, in accordance with examples described herein.

FIG. 2A is a flow chart describing an example method of generating output commands by a modular sensing device, in accordance with examples described herein. In the examples described with respect to FIG. 2A, reference may be made to reference characters representing like features as shown and described with respect to FIGS. 1A and 1B. Furthermore, the methods and processes described with respect to FIG. 2A may be performed by an example modular sensing device 100, 150 as shown and described with respect to FIGS. 1A and 1B. Referring to FIG. 2A, the modular sensing device 150 can receive a mode selection input (200). In some examples, the mode selection input can comprise the user physically pushing an analog mode selector 155 on the modular sensing device 150. Additionally or alternatively, the mode selection input can comprise a specified gesture performed while using the modular sensing device 150.

In response to the mode selection input, the modular sensing device 150 can interpret the final state machine reports 188 in accordance with the mode selected (205). As provided herein, the modular sensing device 150 can operate in any number of modes, with each mode corresponding to controlling a remote device (e.g., drive mode), generating user tasks and feedback in connection with a remote device (e.g., training mode), generating user tasks and feedback in conjunction with another modular sensing device (e.g., playing a real-world game with another user), and/or generating standalone user tasks and feedback. As provided herein, user tasks can comprise instructions or suggestions to the user via the output devices of the modular sensing device in accordance with the selected mode. Such instructions or suggestions can be generated based on a programmed game, in which the user is to utilize the modular sensing device 150 to perform gestures and action, search for a certain signal source, cause the remotely operated device 140 to perform a set of actions, and the like. Furthermore, feedback can comprise reactive output to the tasked actions to be performed by the user. For example, the feedback can comprise audio, visual, and/or haptic responses to actions indicating affirmative or negative completion of such tasks. In one example, the feedback indicates to the user whether an instructed task or gesture (e.g., indicated by the sensor data 167 and correlated state machine) has successfully been performed.

According to several examples, the final state machine reports 188 can be correlated to a specified output. Thus, based on each final state machine report 188 the modular sensing device 150 can generate commands in accordance with the mode and, when relevant, the sub-mode of the device 150 (220). As provided herein, such generated commands can include output commands 164 to output audio (222), visual (226), and/or haptic (224) output on the modular sensing device 150. Additionally or alternatively, the modular sensing device 150 can generate control commands 162 (228) for operating a remotely operated device 140. In either case, the modular sensing device 150 can transmit or execute the commands accordingly (225).

At any given time in any given mode, the modular sensing device 150 can identify a sub-mode trigger 186 in the final state machine reports 188 (210). In response to the sub-mode trigger 186, the modular sensing device 150 can reconfigure interpretation of one or more final reports from one or more corresponding state machines (215). Based on each final state machine report 188, the modular sensing device 150 can generate commands in accordance with the mode and the sub-mode of the device 150 (220), including the altered interpretations based on the sub-mode trigger(s) 186. As discussed above, such generated commands can include output commands 164 to output audio (222), visual (226), and/or haptic (224) output on the modular sensing device 150. Additionally or alternatively, the modular sensing device 150 can generate control commands 162 (228) for operating a remotely operated device 140. In either case, the modular sensing device 150 can transmit or execute the commands accordingly (225).

Figure 2B:
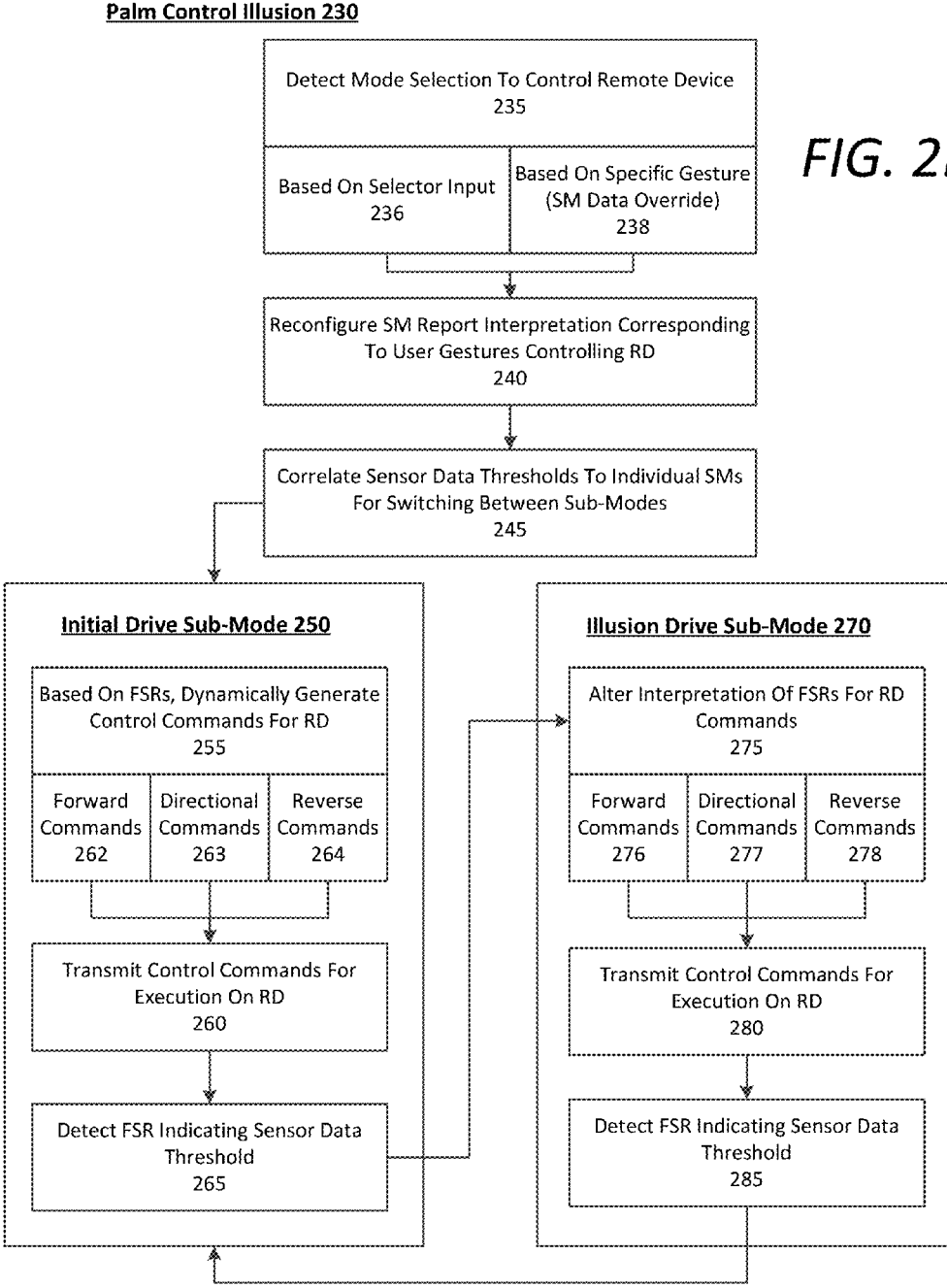
FIG. 2B is a flow chart describing a state machine-based example method of controlling a remotely operated device using a modular sensing device.

FIG. 2B is a flow chart describing a state machine-based example method of controlling a remotely operated device using a modular sensing device. In the below discussion of FIG. 2B, reference may be made to reference characters representing like features as shown and described with respect to FIGS. 1A and 1B. Furthermore, the methods and processes described with respect to FIG. 2B may be performed by an example modular sensing device 150 as shown and described with respect to FIG. 1B. Still further, the steps described in FIG. 2B represent steps performed to produce a palm control illusion (230) in the drive mode, as described herein. Referring to FIG. 2B, the modular sensing device 150 can detect a mode selection to control a remotely operated device 140 (e.g., a drive mode) (235). The mode selection can be based on an input on the mode selector 155 (236), or based on a specified gesture performed by the user (e.g., a push gesture with the wearable device) (238).

In response to the mode selection, the modular sensing device 150 can reconfigure state machine report interpretation corresponding to user gestures for controlling the remotely operated device 140 (240). As such, final state machine reports 188 can be interpreted by the modular sensing device 150 as control commands 162 for operating the remote device 140. Furthermore, in certain implementations, the modular sensing device 150 can correlate sensor data thresholds to individual state machines for switching between sub-modes (245). Specifically, the final state reports 188 from those state machines can comprise sub-mode triggers 186 indicating that a gesture or combination of gestures has been performed (e.g., raising an arm above a threshold angle) that causes the modular sensing device 150 to reconfigure its interpretation of certain final state reports 188.

When initializing the drive mode, the modular sensing device 150 can begin in an initial drive sub-mode (250), which enables initial or default control of the remote device 140 using a specified set of gestures. In the initial drive sub-mode, the modular sensing device 150 can dynamically generate control commands 162 for the remote device 140 based on final state reports 188 received from the state machines (255). Such commands 162 can include forward acceleration commands (262), directional or steering commands (263), and/or deceleration or reverse commands (264). Furthermore, the initial drive sub-mode (250) can correspond to user control of the remote device 140 moving forward and away from the user. After generating each command 162, the modular sensing device 150 can transmit the control command 162 to the remote device 140 for execution (260). Accordingly, the user can control the remote device 140 using arm gestures (or other gestures depending on the wearable device), causing the remote device 140 to accelerate and maneuver accordingly. In many aspects, this initial drive mode (250) can be perceived as the user "pushing" the remote device 140, and steering the remote device while performing a pushing gesture.

During operation, the modular sensing device 150 can detect a final state report 188 from a specified state machine correlated to a sensor data threshold (265). As described herein, this final state report 188 can comprise a sub-mode trigger 186 indicating that the user has performed a threshold gesture. In certain examples, the threshold gesture can correspond to the user raising and/or lowering an arm across a threshold angle (e.g., 45 degrees). Additionally or alternatively, the threshold gesture can correspond to the user turning a palm from downwards to upwards. Furthermore, in response to the detected sub-mode trigger 186, the modular sensing device 150 can reconfigure certain final state report 188 interpretations in an illusion drive sub-mode (270). In certain aspects, the sub-mode trigger 186 causes the modular sensing device 150 to begin interpreting a new set of final state reports 188 that were previously not relevant in the initial drive sub-mode (250). Additionally or alternatively, interpretation of certain final state reports may be switched. For example, interpretation of the final state reports 188 for left turns versus right turns may be switched.

Thus, the modular sensing device 150 can alter interpretation of final state reports 188 in generating control commands 162 for the remote device 140 (275). For example, the modular sensing device 150 can utilize a different final state report 188 from a different state machine to generate forward acceleration commands for the remote device 140 (276). Also, the directional or steering commands can be triggered by different final state reports 188 as compared to the initial drive sub-mode (250). In one example, the modular sensing device 150 can switch the state machines corresponding to such directional steering commands. Thus, a leftward arm movement in the illusion drive sub-mode (270) can correspond to a right turn by the remote device 140. Thus, as the remote device 140 travels back towards the user, an illusion is perceived that the user's leftward arm movement directly correlates to a force pulling the remote device 140 leftward from the user's perspective. Still further, the modular sensing device 150 can alter an interpretation of a particular final state report 188 from a state machine to generate deceleration or reverse commands (278).

When such gestures are completed by the user wearing the modular sensing device 150, the modular sensing device can dynamically generate and transmit the control commands 162 to the remote device 140 for execution (280). Thus, as long as another threshold gesture is not detected, the user can operate the remote device 140 in the illusion drive sub-mode (270), which can be perceived as the user "pulling" the remote device and steering the remote device in conjunction with the pulling arm gesture. While in the illusion drive mode (270), the modular sensing device 150 can receive a final state report 188 indicating another sensor data threshold (285). In some examples, the threshold can correspond to crossing the previous threshold in a reverse manner (e.g., going from palm up to palm down and/or lowering the arm below 45 degrees in relation to the horizontal plane). In variations, the drive mode can include a third, fourth, fifth, or n drive sub-mode in the underlying drive mode, in which the modular sensing device 150 reconfigures interpretation of certain final state reports 188, or begins to interpret new final state reports 188. In any case, upon detecting the final state report 188 indicating the respective sensor data threshold, the modular sensing device 150 can revert to the initial drive sub-mode (250), or a separate drive sub-mode depending on the gesture threshold.

In certain implementations, some control commands 162 can be attributed to two or more state machines. For example, a first state machine can be associated with an acceleration command in the drive mode, and a second state machine can also be associated with the acceleration command. Thus, final state reports 188 from each of these state machines can cause the modular sensing device 150 to generate an acceleration command. Along these lines, two or more state machines can also cause the modular sensing device 150 to generate the same output via the haptic 192, visual 194, and audio 196 systems in the same mode. For example, swinging gestures may be performed from multiple relative angles (e.g., corresponding to tennis swings or sword fighting strokes). In certain modes, final state reports 188 from state machines corresponding to each of such swings can cause the modular sensing device 150 to output the same or similar sounds, vibrations, and/or light outputs.

Modular Sensing Device

Figure 3:
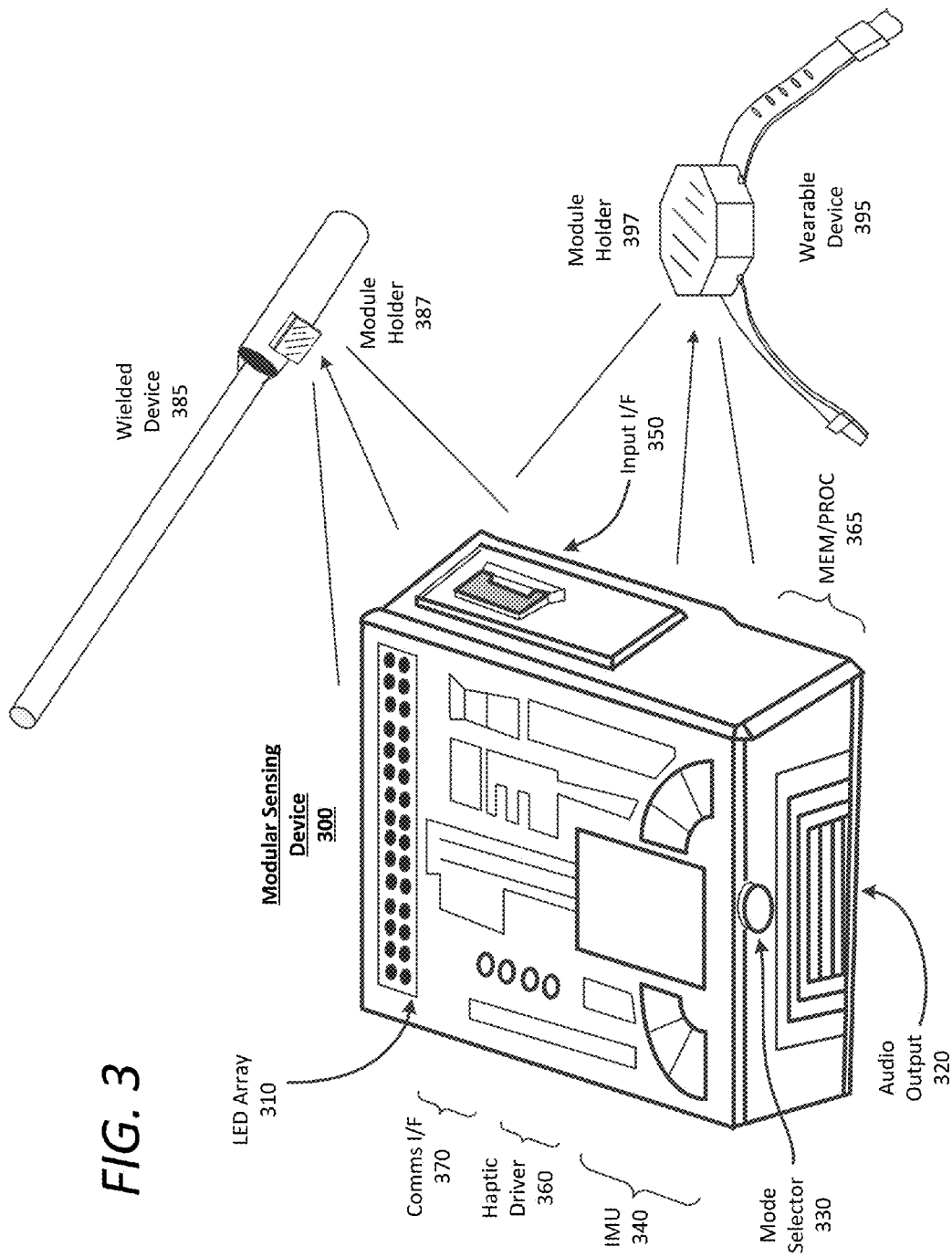
FIG. 3 illustrates an example modular sensing device insertable into a plurality of compatible apparatuses.

FIG. 3 illustrates an example modular sensing device insertable into a plurality of compatible apparatuses. The modular sensing device 300 shown in FIG. 3 can comprise various components and modules of the modular sensing devices 100, 150 shown in the block diagrams of FIGS. 1A and 1B. Referring to FIG. 3, the modular sensing device 300 can include a number of output devices, such as an LED array 310, an audio output device 320 (e.g., a speaker), and a haptic driver 360 (included within the device). Furthermore, the modular sensing device 300 can include a mode selector 330, which can comprise an analog or digital button to enable the user to select a particular mode of the device 300 by, for example, scrolling through a stored series of modes. The modular sensing device 300 can further include memory and processing resources 365 that can execute the selected mode (either in the state machine implementation (FIG. 1B) or the executed instruction set implementation (FIG. 1A) described herein).

In various aspects, the modular sensing device 300 also includes a communications interface 370 (e.g., a BLUETOOTH low energy, WiFi, WiGig, WiMAX, or cellular radio interface), and an IMU 340 to provide the memory and processing resources 365 with sensor data for detecting gestures performed by the user. As described herein, depending on the mode and sub-mode of the device 300 the memory and processing resources 365 interpret the sensor data to generate outputs via the output devices 310, 320, 360 and/or commands or responses to be output to a connected device via the communications interface 370 (e.g., a remotely operated device or another modular sensing device). Furthermore, in some implementations, the modular sensing device 300 can include an input interface 350 (e.g., a mini-USB port) to enable charging of one or more batteries and/or uploading of additional mode instructions. In variations, the modular sensing device 300 can include an induction interface to charge one or more batteries and/or to enable inductive pairing with a second device to establish a wireless communications link.

In the various examples described herein, the modular sensing device 300 can be insertable into or otherwise attachable to any number of compatible apparatuses, such as wearable devices 395 (wrist devices, rings, pendants, hats, glasses, etc.) wielded devices 385, companion toys or dolls, and the like. Furthermore, the modular sensing device 300 can be implemented in various other form factors, can be sewn into clothing, or can be mounted, glued, or otherwise attached to various apparatuses. Such apparatuses can each include a module holder 387, 397 into which the modular sensing device 300 may be inserted or otherwise mounted or attached. Thus, according to examples provided herein, the user can utilize the apparatuses into which the modular sensing device 300 has been inserted or attached, to perform various gestures in accordance with a selected mode of the modular sensing device 300.

Multi-Device Usage

Figures 4, 5:
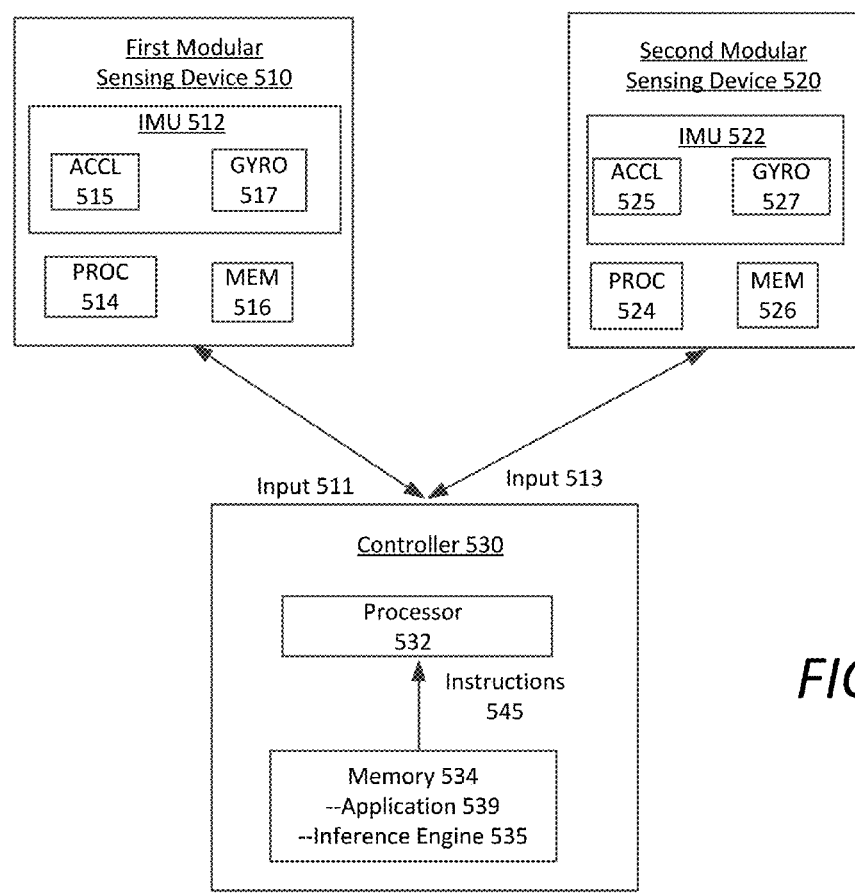
FIG. 4 illustrates an embodiment of multiple sensing devices that concurrently provide input for a program or application which utilizes the inputs, along with inferences which can be made about a person or object that carries the devices, according to one or more examples.
FIG. 5 illustrates a system which concurrently utilizes input from multiple modular sensing devices in connection with execution of an application or program.

FIG. 4 illustrates an embodiment of multiple sensing devices that concurrently provide input for a program or application which utilizes the inputs, along with inferences which can be made about a person or object that carries the devices, according to one or more examples. In particular, an example such as shown enables input from multiple sensing devices to be used for purpose of enabling inferences of movement and pose from two relevant sources of user motion. For example, in FIG. 4, a user 401 carries wearable devices in the form of a wrist device 410 and pendent 412. In other examples, one or both of the wrist device 410 and pendent 412 can be in the form of an alternative form factor or device type. For example, the combination of sensing devices can include a hat, a ring, eyeglasses or a device which the user can carry in his or her hand (e.g., FOB, mobile computing device). In variations, more than two wearable devices can be employed by one user.

FIG. 5 illustrates a system which concurrently utilizes input from multiple modular sensing devices in connection with execution of an application or program. With reference to an example of FIG. 5, a multi-device system includes a first modular sensing device 510, a second modular sensing device 520, and a controller 530. Each of the first and second modular sensing devices 510, 520 includes a respective inertial measurement unit (IMU) 512, 522, a processor 514, 524 and memory 516, 526. The IMU 512, 522 of each modular sensing device 510, 520 can include sensors such as an accelerometer 515, 525 and gyroscopic sensor 517, 527. The first and second modular sensing devices 510, 520 may also include additional sensing resources, such as a magnetometer and/or proximity sensor.

The controller 530 can include a processor 532 and a memory 534. The processor 532 can execute instructions 535 for a program or application that can execute and process inputs 511, 513 from each of the respective modular sensing devices 510, 520. In some variations, the controller 530 is a mobile computing device, such as a multi-purpose wireless communication device which can wirelessly communicate with each of the first and second modular sensing devices 510, 520.

While an example of FIG. 5 illustrates the controller 530 as a separate device from the first and second modular sensing devices 510, 520, variations provide that the controller 530 is integrated or otherwise combined with at least one of the first or second modular sensing devices 510, 520. For example, the controller 530 can include a multi-purpose wireless communication device that is equipped with a gyroscopic sensor and accelerometer. Thus, for example, variations can provide the second modular sensing device 520 to be a local resource of the controller 530, which communicates with the first modular sensing device 510.

With further reference to FIG. 5, the controller 530 can receive inputs 511, 513 from respective first and second modular sensing devices 510, 520. The inputs 511, 513 can be received in connection with an application 539 or program that is executed by the processor 532 of the controller 530. The processor 532 can execute the instructions 545 in order to implement an inference engine 535 for determining inferences about the person or object with one or both of the modular sensing devices 510, 520. For example, the application 539 can correspond to a game or simulation, and the inference engine 535 can be specific to the application 539. Among other applications, the inference engine 535 can be used to determine when the motions of two modular sensing devices 510, 520 are separate and distinct from one another, or continuous and/or part of the same input motion.

According to one implementation, each input 511, 513 can correspond to one or more of a position, height, orientation, velocity, linear and/or rotational acceleration. Each of the first and second sensing devices 510, 520 generate a set of measured (or sensed data) corresponding to, for example, a movement (e.g., gesture) made with the respective sensing device 510, 520. Additionally, the controller 530 can process input 511, 513 corresponding to each of the respective data sets in order to determine a third data set of inferences. In this way, the inferences reflect information determined from sensed data, rather than directly measured data. The inferences which can be output from the inference engine 535 can be determinative or probabilistic, depending on implementation.

With reference to an example of FIG. 4, user 401 can wear two modular sensing devices, and the inference engine 535 can assume some inferences based on anatomical constraints and/or context (e.g., such as provided from execution of the application 539). For example, each of the first and second modular sensing devices 510, 520 can correspond to a wearable wrist device. Alternatively, the second modular sensing device 520 can correspond to the pendent 412 or neck-worn device. By way of example, if the first modular sensing device 510 (wrist device 410) is detected to be in motion, the inference engine 535 can be used to determine additional position data for the movement of that device along a third axis based on orientation, position or context of second modular sensing device 520 (wrist device 411 or pendent device 412). For example, if the first modular sensing device 510 (wrist device 411) measures arc motion, and the second modular sensing 520 is the pendent, then the orientation of the second modular sensing device can indicate whether, for example, the arc motion is in front of the user or to the user's side. Alternatively, if the second modular sensing device 520 is the second wrist device 412, the information sensed from the second wrist device can identify the corresponding hand or device as being in front of the body. In such an orientation, the inference engine 535 can determine the inference to be that the user is making the arc of motion in front of his body. Similarly, if the height of the second sensing device 520 is determined to be belt high and the device is held by the user, the orientation of the user's torso can be inferred (along with the direction of the arc).

In examples in which the second modular sensing device 520 is a pocket device (e.g., mobile computing device, FOB), information can be determined from, for example, the height of the device (e.g., user standing, crouching or jumping) and the rotation of the device. For example, if the second modular sensing device 520 is pocket word, a change in the orientation of the device from vertical to horizontal, in combination with a downward acceleration can indicate the user is crouching. If the user is crouching, for example, the type of motion that is likely by the first modular sensing device 510 may be limited (e.g., motion of the wrist device 410 is likely in front of user when user is moving up or down). The examples described with respect to FIGS. 4 and 5 can enable the user to utilize the modular sensing device(s) in connection with a real-world gameplay environment (or other task-oriented activities) executed by one or more of the modular sensing devices 510, 520, control a remotely operated device using gestures sensed by the modular sensing devices 510, 520, interact with other users, and perform various tasks in which the modular sensing devices 510, 520 can provide feedback and response output.

Hardware Diagram

Figure 6:
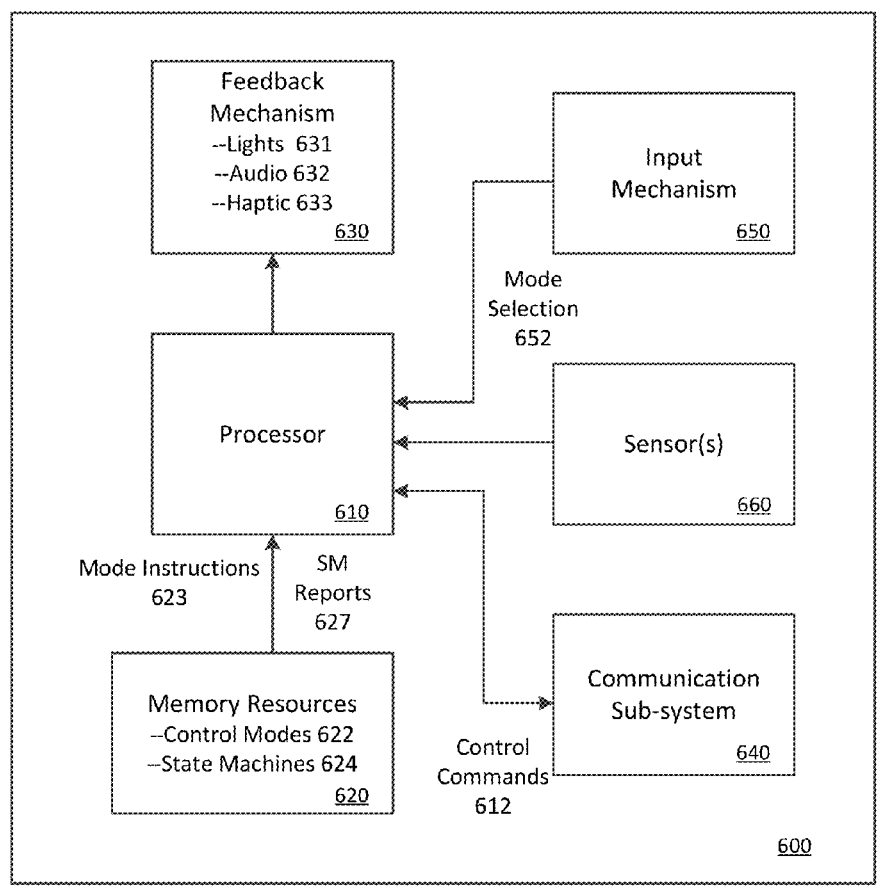
FIG. 6 is a block diagram of an example modular sensing device upon which examples described herein may be implemented.

FIG. 6 is a block diagram of an example modular sensing device upon which examples described herein may be implemented, such as the wearable device 100 of FIG. 1A.

In an example of FIG. 6, the modular sensing device 600 includes a processor 610, memory resources 620, a feedback mechanism 630 (e.g., audio 632, haptic 633, visual 631 devices), a communication sub-systems 640 (e.g., wireless communication sub-systems such as BLUETOOTH low energy), one or more sensors 660 (e.g., a gyroscopic sensor or accelerometer) and an input mechanism 650 (e.g., an analog or digital mode selector). In one example, the communication sub-system 640 sends and receives data over one or more channels.

The memory resources 620 can store mode instructions 623 corresponding to a plurality of control modes 622, as described herein, which can be executed by the processor 610 to initiate a particular mode. Certain executing mode instructions 623 can initiate the communication sub-system 640 to establish one or more wireless communication links with the self-propelled device and/or the mobile computing device. Execution of a control mode 622 by the processor 610 may cause the processor 610 to generate distinct feedback responses using the feedback mechanism 630 based on sensor data from the sensor(s) 660 indicating user gestures performed by the user.

In some examples, the memory resources 620 can comprise a number of state machines 624 which can provide state machine reports 627 to the processor 610 can specified sensor patterns are identified by respective states machines 624. Each state machine 624 may monitor for a single sensor pattern which, if identified by that state machine 624, can cause the state machine 624 to transition states, thereby providing a state machine report 627 to the processor 610 identifying the user gesture performed. The processor 610 can translate the state machine reports 627—which indicate the user gestures—in accordance with an executing set of mode instructions 623 in order to generate a corresponding output via the feedback mechanism 630 and/or control commands 612 to be communicated to the self-propelled device via the communication sub-system 640.

CONCLUSION

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that this disclosure is not limited to those precise examples. As such, many modifications and variations will be apparent to practitioners skilled in this art. Accordingly, it is intended that the scope of this disclosure be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude the inventor from claiming rights to such combinations.

What is claimed is:

1. A modular sensing device comprising:
an inertial measurement unit to generate sensor data corresponding to user gestures performed by a user;
a mode selector for receiving a selection of a mode of the modular sensing device out of a plurality of modes;
one or more output devices to generate output based on the user gestures and the selected mode; and
a controller to implement a plurality of state machines, at least one state machine of the plurality of state machines being associated with a corresponding user gesture by a sensor data signature, wherein the respective state machine executes a state transition when the sensor data matches the sensor data signature, the executed state transition causing the controller to generate a corresponding output via the one or more output devices specific to the selected mode and based on the corresponding user gesture, and wherein the controller initiates a sub-mode in response to a particular user gesture, the sub-mode causing the controller to modify interpretation of the state transition for the selected mode, and wherein the modular sensing device generates the corresponding output based on the modified interpretation.

2. The modular sensing device of claim 1, wherein the respective state machine continuously iterates based on the sensor data from the inertial measurement unit and automatically executes the state transition when the sensor data matches the sensor data signature.

3. The modular sensing device of claim 1, wherein the modular sensing device is insertable into a wearable device, and wherein the corresponding user gesture comprises a sequence of actions performed by the user utilizing the wearable device.

4. The modular sensing device of claim 3, wherein the sensor data signature provides the respective state machine with a threshold error tolerance for each of the sequence of actions.

5. The modular sensing device of claim 3, wherein, for a particular iteration, the respective state machine terminates when the corresponding user gesture diverges from the sequence of actions.

6. The modular sensing device of claim 3, wherein, for a particular iteration, the respective state machine automatically terminates if one of the set of states does not transition.

7. The modular sensing device of claim 1, wherein the state transition of the respective state machine causes the controller to generate distinct outputs based on the selected mode.

8. The modular sensing device of claim 1, wherein the corresponding output comprises one or more control commands enabling the user to control a remote controlled device using the modular sensing device.

9. The modular sensing device of claim 1, wherein the one or more output devices include a haptic system, an audio system, and a visual system.

10. The modular sensing device of claim 1, wherein the respective state machine comprises a finite set of states, one or more inputs, one or more outputs, a transition function, and an initial state.

11. The modular sensing device of claim 1, wherein the respective state machine comprises a set of states, and wherein each state in the set of states transitions in sequential order in order to cause the state transition.

12. The modular sensing device of claim 1, wherein the controller initiates a second mode, from the plurality of modes of the modular sensing device, when the user performs a specific user gesture.

13. The modular sensing device of claim 1, wherein the modular sensing device is configured to be portable and insertable into at least one compatible apparatus.

14. The modular sensing device of claim 13, wherein the at least one compatible apparatus comprises a wrist-worn device and a wielded device.

15. The modular sensing device of claim 1, wherein each of the plurality of state machines is associated with a corresponding user gesture by a sensor data signature.

16. A method of generating outputs based on user gestures, the method being performed by a modular sensing device and comprising:
receiving a mode selection input to select a mode from a plurality of selectable modes;
in response to the mode selection input, utilize a plurality of state machines to interpret user gestures in accordance with the selected mode, at least one state machine of the plurality of state machines being associated with a corresponding user gesture by a sensor data signature, wherein the respective state machine executes a state transition when the sensor data matches the sensor data signature;
in response to the executed state transition, generating a final state report corresponding to the selected mode and based on the corresponding user gesture;
modifying the interpretation of the final state report; and
generating the corresponding output via one or more output devices of the modular sensing device based on the modified interpretation.

17. The method of claim 16, wherein the selected mode comprises a drive mode, the drive mode enabling the user to control a self-propelled device with the modular sensing device.

18. The method of claim 16, wherein the selected mode comprises a smart home control mode, the smart home control mode enabling the user to control at least one smart home device using the modular sensing device.

19. The method of claim 16, wherein the selected mode comprises a gaming mode, the gaming mode causing the modular sensing device to output task-oriented instructions for the user to perform in connection with a game.

20. The method of claim 16, wherein the one or more output devices include a haptic driver, one or more light elements, and one or more audio elements.

* * * * *